(12) United States Patent
Vicari et al.

(10) Patent No.: US 10,316,124 B2
(45) Date of Patent: Jun. 11, 2019

(54) COLD WATER SOLUBLE POLYVINYL ALCOHOL/ALKYL ACRYLATE COPOLYMERS AND FILMS THEREOF

(75) Inventors: Richard Vicari, Pearland, TX (US); Bret F. Hann, San Antonio, TX (US)

(73) Assignee: Sekassai Specialty Chemicals America, LLC, Dallas, TX (US)

( * ) Notice: Subject to any disclaimer, the term of this patent is extended or adjusted under 35 U.S.C. 154(b) by 1392 days.

(21) Appl. No.: 13/328,338

(22) Filed: Dec. 16, 2011

(65) Prior Publication Data

US 2012/0164424 A1    Jun. 28, 2012

Related U.S. Application Data

(60) Provisional application No. 61/459,979, filed on Dec. 22, 2010.

(51) Int. Cl.
*C08F 220/18*    (2006.01)
*C08F 218/08*    (2006.01)

(52) U.S. Cl.
CPC .......... *C08F 220/18* (2013.01); *C08F 218/08* (2013.01); *Y10T 428/2998* (2015.01)

(58) Field of Classification Search
CPC ................. C08F 220/06; C08F 220/18; C08F 220/1808; C08F 21/08; C08F 218/08; C08L 2666/12; B32B 27/306; B32B 27/308; B32B 27/14; C09D 5/16; C09D 5/1618; Y10T 428/2998
USPC .................. 252/176; 428/220, 407; 521/144; 525/56, 57, 69, 61, 62
See application file for complete search history.

(56) References Cited

U.S. PATENT DOCUMENTS

| 3,607,852 A | 9/1971 | Eichhorn et al. |
| 3,689,469 A † | 9/1972 | Inskip |
| 3,692,754 A * | 9/1972 | Hirooka .................... C08F 8/16 525/328.9 |

(Continued)

FOREIGN PATENT DOCUMENTS

| CN | 101193955 A | 6/2008 | |
| EP | 0 121 874 | 10/1984 | ............ C08F 226/10 |

(Continued)

OTHER PUBLICATIONS

Striegel, Andre M. "Determining the vinyl alcohol distribution in poly(vinyl butyral) using normal-phase gradient polymer elution chromatography," Journal of Chromatography A, Sep. 20, 2002, Elsevier, vol. 971, Issues 1-2, pp. 151-158.*

(Continued)

*Primary Examiner* — Maria V Ewald
*Assistant Examiner* — Ethan Weydemeyer
(74) *Attorney, Agent, or Firm* — Ferrells, PLLC; Michael Ferrell; Anna Kinney (57) ABSTRACT

Cold water-soluble PVOH/alkyl acrylate copolymers are provided with a substantially random distribution of monomers which is reflected in the polymer's cold water solubility, GPEC chromatograms and may be confirmed by $C^{13}$ NMR. The product is particularly useful for films used in packaging and for encapsulating particulate products. Encapsulated products which may be provided include fertilizer or other agricultural products, pharmaceutical products, biomedical products and cosmetic products.

21 Claims, 3 Drawing Sheets

(56) References Cited

U.S. PATENT DOCUMENTS

| | | | |
|---|---|---|---|
| 4,048,413 A | | 9/1977 | Wilkens |
| 4,156,047 A † | | 5/1979 | Wysong |
| 4,618,648 A | | 10/1986 | Marten |
| 4,747,976 A † | | 5/1988 | Yang |
| 4,772,663 A † | | 9/1988 | Marten |
| 4,948,857 A | | 8/1990 | Marten et al. |
| 5,362,515 A | | 11/1994 | Hayes et al. |
| 5,436,293 A | | 7/1995 | Hayes et al. |
| 6,946,501 B2 † | | 9/2005 | Kochvar |
| 7,622,132 B2 | | 11/2009 | Lee et al. ............... 424/401 |
| 7,745,517 B2 | | 6/2010 | Vicari et al. ............. 524/56 |
| 7,786,229 B2 * | | 8/2010 | Vicari ............... C08F 216/06 526/303.1 |
| 7,790,815 B2 | | 9/2010 | Vicari ............... 526/65 |
| 7,799,752 B2 | | 9/2010 | Ness et al. ............. 512/4 |
| 7,932,328 B2 | | 4/2011 | Vicari ............... 526/65 |
| 2004/0161557 A1 * | | 8/2004 | Verrall ............... B65D 65/46 428/35.2 |
| 2005/0222355 A1 † | | 10/2005 | Vicari |
| 2006/0039934 A1 * | | 2/2006 | Ness et al. ............. 424/401 |
| 2007/0034575 A1 * | | 2/2007 | Tufano ............... C02F 1/722 210/759 |
| 2007/0123631 A1 * | | 5/2007 | Halasa ............... B60C 1/0016 524/493 |

FOREIGN PATENT DOCUMENTS

| | | | | |
|---|---|---|---|---|
| EP | 1418196 A1 | 5/2004 | | |
| JP | 4835719 | 10/1973 | | |
| JP | S49036797 | 4/1974 | | |
| JP | 63182311 A | 7/1988 | | |
| JP | 63182313 A | 7/1988 | | |
| JP | 2005089655 A | 4/2005 | | |
| JP | 2005139240 A | 6/2005 | | |
| WO | WO 97/19961 | 6/1997 | ............... C08F 8/28 |
| WO | 2004/016234 A1 † | 2/2004 | | |
| WO | 2006042169 A2 | 4/2006 | | |

OTHER PUBLICATIONS

Yue et al., "Particle Encapsulation With Polymers Via in Situ-Polymerzation in Supercritical $CO_2$", *Powder Technology* 146 (2004), pp. 32-45; and.

Cools et al., "Determination of the Chemical Composition Distribution of Copolymers of Styrene and Butadiene by Gradient Polymer Elution Chromatography", *Journal of Chromatograph A*, 736 (Elsevier Science B.V., 1996), pp. 125-130.

International Search Report and Written Opinion.

Yue et al., "Particle Encapsulation With Polymers Via in Situ-Polymerzation in Supercritical CO2", Powder Technology 146 (2004), pp. 32-45.

International Preliminary Report on Patentability, dated Jun. 25, 2013.

Japanese Office Action dated Jul. 7, 2015.

Chinese Office Action dated Apr. 7, 2016, with translation.

R.K. Tubbs, "Polyvinyl Alcohol Acrylate and Methacrylate Copolymers and their Applications in Textile Sizing and Films", Polyvinyl Alcohol Developments, 1992, Ch. 11: pp. 361-374, John Wiley & Sons Ltd.

Hans-George Elias, Ch. 12: "Copolymerisalionen", Macromoleküle, 6th Ed., 1999, pp. 376-416,Wiley-VCH Verlag GmbH, Weinheim (Federal Republic of Germany).

Contents, Polymer Handbook, 3rd Ed., 1989, pp. xi-xii, John Wiley & Sons, Inc.

Robert Z. Greenley, "Free Radical Copolymerization Reactivity Ratios", Polymer Handbook, 3rd Ed., 1989, pp. 153-266, John Wiley & Sons, Inc.

Robert Z. Greenley, "Q and e values for Free Radical Copolymerization of Vinyl Monomers and Telogens", Polymer Handbook, 3rd Ed., 1989, pp. 267-274, John Wiley & Sons, Inc.

Affirmation in lieu of Oath of G. Michael Collins, Ph.D., dated Mar. 8, 2016.

Affirmation in lieu of Oath of Keisuke Morikawa, dated Mar. 9, 2016 (Re JP S49036797, Ex. 1 & CE2).

Afirmation in lieu of Oath of Keisuke Morikawa, dated Mar. 9, 2016 (Elvanol 80-18).

DuPont Elvanol 80-18 (Polyvinyl Alcohol) Product Data Sheet, pp. 1-3, DuPont.

GPEC Analysis of Elvanol 80-18, p. 84.

Dissolution test of Elvanol 80-18, p. 85.

Sale/Purchase Information of Elvanol 80-18, 2002.

A.S. Brar, Reactivity Ratios and Microstructure Determination of Vinyl Acetate-Alkyl Acrylate Copolymers by NMR Spectroscopy, Journal of Polymer Science: Part A: Polymer Chemistry, vol. 33, pp. 109-116 (1995), John Wiley & Sons, Inc.†

A.S. Brar, Reactivity ratios and microstructure determination of vinyl acetate-ethyl methacrylate copolymers, Polymer vol. 37, No. 12, pp. 2451-2457 (1996), Elsevier Science Ltd., printed in Great Britain.†

J.M.G. Cowie, Polymers: Chemistry and Physics of Modern Materials: Chapter 5: Copolymerization, Second Edition, pp. 104-122, (1991), Published in the USA by Chapman and Hall.†

T.A. Garrett, Reactivity Ratios for the Copolymerization of Vinyl Acetate with Methyl Acrylate, Journal of Polymer Science: Part A-1, vol. 4 (1966), pp. 2714-2717.†

* cited by examiner
† cited by third party

FIG. 2
GPEC 50:50 SPLIT

COLD WATER SOLUBLE POLYVINYL ALCOHOL/ALKYL ACRYLATE COPOLYMERS AND FILMS THEREOF

CLAIM FOR PRIORITY

This non-provisional application claims the benefit of the filing date of U.S. Provisional Patent Application Ser. No. 61/459,979, entitled "Process for Forming Polyvinyl Alcohol With Improved Aqueous Solubility", filed Dec. 22, 2010. The priority of U.S. Provisional Patent Application Ser. No. 61/459,979 is hereby claimed and the disclosure thereof is incorporated into this application by reference.

TECHNICAL FIELD

The present invention relates generally to water-soluble polyvinyl alcohol (PVOH) polymers and articles, especially films for packaging and for encapsulating particulate products. The cold water-soluble PVOH/Alkyl Acrylate copolymers of the invention have a substantially random distribution of monomers which is reflected in its cold water solubility and GPEC chromatograms.

BACKGROUND

Polyvinyl alcohol (PVOH) is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then is known as partially hydrolyzed, it is more weakly hydrogen-bonded and less crystalline and is soluble in cold water— less than about 50° F. (10° C.). Both fully and partially hydrolyzed PVOH types are commonly referred to as PVOH homopolymers although the partially hydrolyzed type is technically a vinyl alcohol-vinyl acetate copolymer.

The term PVOH copolymer is generally used to describe polymers that are derived by the hydrolysis of a copolymer of a vinyl ester, typically vinyl acetate, and another monomer such as, for example, an ethylenically unsaturated monomer, e.g., 2-acrylamido-2-methyl propane sulfonic acid; see U.S. Pat. Nos. 7,932,328; 7,790,815; 7,786,229 and 6,818,709 all to Vicari. PVOH copolymers can be tailored to desired film characteristics by varying the kind and quantity of copolymerized monomers.

It is known in the art that many PVOH copolymers, because of their structure, can be much more rapidly soluble in cold water than the partially hydrolyzed type of PVOH homopolymers. Such copolymers have therefore found considerable utility in the fabrication of packaging films for the unit dose presentation of various liquid and powdered products including agrochemicals, household and industrial cleaning chemicals, laundry detergents, water treatment chemicals, and the like. However, not all PVOH copolymers have desirable and optimal water solubility to be useful in the fabrication of packaging films for the unit dose presentation of various liquid and non-liquid (e.g. powdered) products or encapsulating these products including fertilizer, agrochemicals, household and industrial cleaning chemicals, laundry detergents, water treatment chemicals, and the like.

SUMMARY OF THE INVENTION

Applicants have found that by controlling alkyl acrylate (AA) monomer feed with respect to a vinyl acetate monomer feed in a sequential polymerization process, polymers which are cold water soluble and substantially free of compositional drift are prepared. The copolymerization process preferably includes splitting the quantity of AA into two parts, copolymerizing the first part of AA with all the required vinyl acetate monomer (VAM) in a first reactor and adding only the remaining AA into a second reactor and polymerizing with the copolymer from the first reactor. Upon, saponification, a PVOH which has substantially random distribution of the comonomer composition has vastly improved solubility in cold water. The products are particularly useful for films used in packaging and for encapsulating particulate or liquid products. Encapsulated products which may be provided include fertilizer or other agricultural products, pharmaceutical products, biomedical products and cosmetic products.

The polymers of the invention exhibit characteristic cold water dissolution times of less than 3 minutes, typically less than 2 minutes and preferably exhibit a characteristic cold water dissolution time of 1 minute or less. Similarly, cold water film disintegration times are generally less than 2 minutes, typically less than 1 minute and preferably 45 seconds or less.

Characteristic cold water dissolution times and characteristic cold water film disintegration times are measured on a 76 micron film; however, it will be appreciated that these parameters are a property of the polymer from which the film is made. The polymers of the invention may be made into any suitable thickness for use as a packaging film having a thickness of generally from 10 to 400 microns, typically having a thickness of from 20 to 200 microns and preferably having a thickness of from 25 to 100 microns. The polymers of the invention are also used to encapsulate core products such as particulate solids, liquids and/or gels by way of solution coating, emulsion coating, melt application, spray coating, immersion coating, fluid bed coating, or application with supercritical $CO_2$. Suitable techniques are noted in U.S. Pat. No. 7,799,752, entitled COMPOSITIONS COMPRISING ENCAPSULATED MATERIAL and U.S. Pat. No. 7,622,132, entitled ENCAPSULATED COSMETIC COMPOSITION as well as Yue et al., "Particle Encapsulation With Polymers Via In Situ-Polymerzation in Supercritical $CO_2$", Powder Technology 146 (2004), pp. 32-45, the disclosures of which are incorporated by reference. When used as an encapsulating material, the polymers of the invention are generally applied with a film thickness of from 0.01 to 30 microns, more typically of from 0.05 to 25 microns, still more typically 0.1 to 20 microns such as from 0.25 to 5 microns. Film thicknesses of from 1 to 3 microns are suitably employed for encapsulating many products.

Further features and advantages of the present invention will become apparent from the discussion which follows.

BRIEF DESCRIPTION OF THE DRAWINGS

The present invention is further illustrated by the attached Gradient Polarity Elution Chromatograph ("GPEC") drawings, which are drawn accurately to the scales on their respective axes. The drawings show a plot of the polarity of the polymers (shown by an electrical response in millivolt, mV) as they elute from a GPEC column versus the time of elution (in minutes).

DETAILED DESCRIPTION OF THE INVENTION

The invention is described in detail below with reference to the drawings. Such discussion is for purposes of illustration only. Modifications within the spirit and scope of the present invention, set forth in the appended claims, will be readily apparent to one of skill in the art. Terminology used throughout the specification and claims herein is given its ordinary meaning.

Characteristic cold water film dissolution times and characteristic cold water film disintegration times are measured using a 76 micron film and a slide frame of the class used for photographic slides using the procedure of U.S. Pat. No. 7,745,517 as described hereinafter. It will be appreciated that these parameters are characteristics of the copolymers per se.

There is provided in one aspect of the invention a cold-water soluble, substantially random copolymer of vinyl alcohol ("VOH") and alkyl acrylate ("AA") prepared by copolymerizing vinyl acetate monomer ("VAM") and AA, which copolymer exhibits a characteristic cold water film dissolution time of less than 3 minutes. Generally, the copolymer comprises from 2 to 25 mol % AA; typically, the copolymer comprises from 3 to 10 mol % AA and in preferred cases the copolymer comprises from 4 to 8 mol % AA. The random copolymer also exhibits a characteristic cold water film dissolution time of less than 2 minutes in typical embodiments and preferably the copolymer exhibits a characteristic cold water film dissolution time of less than 1 minute or less. Likewise, the copolymer preferably exhibits a characteristic cold water film disintegration time of less than 1 minute and has a monomodal GPEC chromatogram, such as that shown in FIG. 1.

The AA is suitably selected from methyl acrylate (MA), ethyl acrylate, methyl methacrylate, ethyl methacrylate and mixtures thereof, especially either methyl acrylate or ethyl acrylate.

A packaging film made from the copolymer generally has a thickness of from 10 microns to 400 microns, suitably from 25 microns to 100 microns.

In some applications, the invention provides an encapsulated product comprising an outer encapsulation film surrounding a core product, wherein the encapsulating film comprises a cold water soluble, substantially random copolymer of vinyl alcohol ("VOH") and alkyl acrylate ("AA") prepared by copolymerizing vinyl acetate monomer ("VAM") and AA, which copolymer exhibits a characteristic cold water film dissolution time of less than 3 minutes. The encapsulating film generally has a thickness of from 0.05 microns to 25 microns, typically from 0.25 microns to 5 microns and encapsulates a particulate solid.

The invention also includes a continuous process for making copolymers of vinyl acetate and methyl acrylate.

Saponification of the VAM/MA copolymers was accomplished by treating the paste obtained from the OLDERSHAW™ distillation column used to strip VAM from the effluent from Reactor 2 with 50 wt. % aqueous NaOH at various values of caustic mole ratio (CMR) further diluted with methanol so that the solids content was 35 wt. %. Examples 1-10 illustrate the effect of varying conditions of saponification carried out on the VAM/MA copolymer of Example 3, with the results shown in Table 3.

The process described herein refers to MA being the comonomer. However, it is not to be considered a limitation. Instead, it should be understood that the inventive process is suitable for use with other similar alkyl acrylates too.

A solvent for the comonomers VAM and MA, the polymerization initiator and the copolymer being formed in the two reaction zones is generally employed in the process. Suitable solvents are, for example, methanol, ethanol, and propanol. The preferred solvent is methanol.

As stated before, the total amount of required MA continuously fed to both reaction zones is split into two parts: a first part for the first reaction zone, and the remaining quantity (the second part) for the second reaction zone. The "split" or ratio between the amounts of MA fed to the first reaction zone (first part) and the second reaction zone (second part), respectively, may be, for example, from about 50:50 to about 80:20, preferably from about 60:40 to about 75:25.

The amount of polymerization initiator fed to the first reaction zone may be, for example, about 0.0001 to about 1 wt. % based on the weight of VAM being fed.

The amount of solvent fed to the first reaction zone may be, for example, about 10 to about 40 wt. % based on the weight of VAM being fed. The polymerization initiator is preferably fed to the first reaction zone as a solution in the solvent at a concentration in the solvent of about 0.1 to about 10 wt. % based on the weight of the solution.

The average residence time in the first reaction zone of the components fed to the first reaction zone may be, for example, in the range of about 30 to about 120 minutes, preferably about 45 to about 70 minutes.

The reaction temperature in the first reaction zone is, for example, about 55 to about 85° C. preferably about 60 to about 80° C.

The average residence time in the second reaction zone of the components in the effluent from the first reaction one and the additional MA fed to the second reaction zone may be, for example, in the range of about 30 to about 120 minutes, preferably about 45 to about 70 minutes.

The reaction temperature in the second reaction zone may be, for example, about 55 to about 85° C., preferably about 60 to about 80° C.

The pressure in each reaction zone may be in the range, for example, of about 1 to about 30 psig, preferably about 3 to about 15 psig.

The residence times and temperatures in the first and second reaction zones are generally sufficient to result in the polymerization of substantially all of the MA fed to the system although a small percentage of VAM added to the system may remain unpolymerized.

The polymer solids content in the effluent from the second reaction zone may be, for example, in the range of about 30 to about 85%, preferably about 55 to about 75%, while the percent conversion calculated from actual polymer solids content and the theoretical polymer solids content equal to the amount of monomers added may be in the range of about 40 to about 99%, preferably about 45 to about 50%. The molecular weight of the copolymer from the second reaction zone indicated by the viscosity of a 15 wt. % solution in methanol is in the range, for example, of about 20 to about 200 cps preferably about 35 to about 70 cps.

In carrying out the saponification step resulting in VOH/MA copolymers, the effluent from the second reaction zone may, for example, be fed to a stripping column to remove the more volatile components such as unreacted VAM from the copolymer of VAM and MA. The resulting "paste" is then mixed with an aqueous solution of a strong base such as sodium hydroxide, e.g., containing about 10 to about 50 wt. % of sodium hydroxide to provide base at a caustic mole ratio (CMR, ratio of moles of base to moles of acetate in the copolymer) of about 0.01 to about 0.1. Optionally, an amount of a volatile alcohol, e.g., methanol, may be also added to reduce the solids content in the paste to about 30 to about 65 wt. %. The resulting mass is then allowed to react at a temperature from about room temperature (RT, about 22° C.), to about 50° C. for a period, e.g., about 5 minutes to about 24 hours to obtain a percent hydrolysis of the acetate groups in the copolymer to hydroxyl groups, e.g., in the range of about 70 to about 99+%, preferably in the range of about 80 to about 95%.

The saponified copolymer of VOH and MA may have, for example, about 1 to about 8 mol % of polymerized MA (poly MA), about 0 to about 4 mol % of polymerized VAM (PVAc) and about 75 to about 98 mol % of polymerized vinyl alcohol (PVOH), preferably about 2 to about 7 mol % of poly MA, about 0 to about 2 mol % of PVAc, and about 90 to about 95 mol % of PVOH, a degree of hydrolysis of, for example, about 70 to about 99+%, preferably about 80 to about 95% indicated by $C^{13}$ NMR and a relative molecular weight indicated by the viscosity of a 4% aqueous-solution of the VOH copolymer of, for example, about 5 to about 30 cps, preferably about 15 to about 28 cps.

The following examples further illustrate the invention. Examples 1-10 describe the preparation of copolymers of VAM and methyl acrylate by a continuous process under varying process conditions.

Polymerizations were performed using two jacketed 2-L glass reactors in series fitted with reflux condensers, mechanical stirrers and feed lines. Reactor 1 was fed continuously with vinyl acetate (VAM), methanol containing di(2-ethylhexyl) peroxydicarbonate (TRIGONOX® EHP) initiator, and methyl acrylate, each as a separate feed line using metering pumps. To ensure accurate feed rates, each feed was placed on a balance and the feed rates checked by measuring the weight difference with time. Methyl acrylate was also fed continuously to the second reactor to minimize compositional drift (the split between Reactor 1 (PK1) and Reactor 2 (PK2) was 70:30). Table 1 lists the feed rates and initiator concentrations for the runs. Reactor 1 temperature was 60° C. and Reactor 2 temperature was 64° C. The residence time was 96 minutes in each reactor. The polymer solution coming out of Reactor 2 was fed into an OLDER-SHAW™ distillation column to remove residual vinyl acetate using methanol vapors. Each run was 12 hours long to ensure the polymerization was lined-out.

TABLE 1

Feed rates for the Continuous Polymerization Runs

| Example | % TRIGONOX® EHP in MeOH | Feed rate, g/min | | | | |
|---|---|---|---|---|---|---|
| | | VAM | MA | MeOH/EHP | MA PK1 | MA PK2 |
| 1 | 0.14 | 11.28 | 0.39 | 3.95 | 0.273 | 0.117 |
| 2 | 0.14 | 11.28 | 0.39 | 3.95 | 0.273 | 0.117 |
| 3 | 0.18 | 11.75 | 0.35 | 3.53 | 0.245 | 0.105 |
| 4 | 0.14 | 10.85 | 0.43 | 4.35 | 0.301 | 0.129 |
| 5 | 0.13 | 11.75 | 0.35 | 3.53 | 0.245 | 0.105 |
| 6 | 0.13 | 11.66 | 0.47 | 3.50 | 0.329 | 0.141 |
| 7 | 0.10 | 10.85 | 0.43 | 4.34 | 0.301 | 0.129 |
| 8 | 0.14 | 10.93 | 0.33 | 4.38 | 0.231 | 0.099 |
| 9 | 0.10 | 10.93 | 0.33 | 4.38 | 0.231 | 0.099 |
| 10 | 0.18 | 11.66 | 0.47 | 3.50 | 0.329 | 0.141 |

VAM = vinyl acetate,
MA = methyl acrylate,
PK = polykettle,
EHP = TRIGONOX® EHP di(2-ethylhexyl) peroxydicarbonate initiator Table 2 shows the results from the polymerization of methyl acrylate with vinyl acetate in the examples, including relative molecular weight of the polymer indicated by the viscosity of a 15% solution in methanol, the actual percentage of solids in Reactor 2 and the percent conversions (figures in parentheses) calculated from the actual percent solids and theoretical percent solids (figures not in parentheses).

TABLE 2

Results from the Polymerization of methyl acrylate with vinyl acetate

| Example | 15% viscosity, cps | Reactor 2 solids, wt % | Theoretical solids, wt % (Conversion) |
|---|---|---|---|
| 1 | 55.1 | 38.89 | 74.1(52.05) |
| 2 | 53.1 | 39.81 | 74.1(53.28) |
| 3 | 61.1 | 45.08 | 77.42(58.23) |
| 4 | 42.9 | 39.07 | 72.17(54.14) |
| 5 | 65.8 | 40.38 | 77.42(52.16) |
| 6 | 75.4 | 36.90 | 77.61(47.55) |
| 7 | 55.7 | 33.17 | 72.22(45.93) |
| 8 | 37.1 | 40.75 | 71.99(56.60) |
| 9 | 37.2 | 35.71 | 71.99(49.60) |
| 10 | 63.9 | 42.04 | 77.61(54.17) |

Table 2 shows the overall conversion of vinyl acetate and methyl acrylate into polymer. Based on these theoretical solids levels, which are directly related to the conversion of monomers to copolymer, the conversions ranged from 45.93-58.23%. Residual methyl acrylate (50 ppm to 100 ppm) was determined by GC analysis.

Saponification of the VAM/MA copolymers was accomplished by treating the paste obtained from the OLDER-SHAW™ distillation column used to strip VAM from the effluent from Reactor 2 with 50 wt. % aqueous NaOH at various values of caustic mole ratio (CMR) further diluted with methanol so that the solids content was 35 wt. %. Examples 1-10 illustrate the effect of varying conditions of saponification carried out on the VAM/MA copolymer of Example 3, with the results shown in Table 3.

TABLE 3

Saponification of PVAc-MA

| Examples | CMR | Time of saponification | Temp of saponification | % hydrolysis |
|---|---|---|---|---|
| 1 | 0.02 | 8 hrs | RT | 93.66 |
| 2 | 0.02 | 8 hrs | RT | 93.77 |
| 3 | 0.02 | 8 hrs | RT | 94.92 |
| 4 | 0.02 | 8 hrs | RT | 94.65 |
| 5 | 0.02 | 8 hrs | RT | 94.46 |
| 6 | 0.02 | 8 hrs | RT | 92.70 |
| 7 | 0.02 | 8 hrs | RT | 92.33 |
| 8 | 0.02 | 8 hrs | RT | 94.49 |
| 9 | 0.02 | 8 hrs | RT | 93.61 |
| 10 | 0.02 | 8 hrs | RT | 93.25 |

RT = room temperature

Caustic mole ratio (CMR) was calculated with the assumption the polymer is 100% PVAc. The small amount of co-MA was ignored in the CMR calculation.

As stated, the 50% NaOH was diluted with enough MeOH when added to the paste to dilute the solids to 35%. The NaOH/MeOH was mixed into the paste by hand (10 to 20 min. of mixing) at room temperature. The 40 C saponification gelled after about 1 minute of mixing. The paste was then allowed to react for the time and temperature shown in the above table. Saponification procedures similar to those described in Examples 1-10 were carried out on the polymers of Examples 1-10.

Table 4 shows the compositions and properties of the saponified polymers for each of the examples of Tables 1 and 2 including mol percent of polymerized methyl acrylate, polymerized VAM (PVAc) and polymerized vinyl alcohol (PVOH), degree of hydrolysis indicated by $C^{13}$ NMR, relative molecular weight as indicated by the viscosity of a 4% solution in water and degree of hydrolysis indicated by titration.

TABLE 4

Composition of Copolymer and Final Viscosity

| | Composition of Saponified Polymer by $C^{13}$ NMR | | | Final Results |
|---|---|---|---|---|
| Example | MA, mol % | PVAc, mol % | PVOH, mol % | 4% viscosity, cps |
| 1 | 5.5 | 0.84 | 93.66 | 21.2 |
| 2 | 5.2 | 1.03 | 93.77 | 20.9 |
| 3 | 4.3 | 0.78 | 94.92 | 20.1 |
| 4 | 6.3 | 0 | 94.65 | 16 |
| 5 | 4.6 | 0.94 | 94.46 | 23.9 |
| 6 | 6.3 | 1 | 92.70 | 25.5 |
| 7 | 7.6 | 0.07 | 92.33 | 21.2 |
| 8 | 4.1 | 1.41 | 94.49 | 14.3 |
| 9 | 5.2 | 1.19 | 93.61 | 16.1 |
| 10 | 5.3 | 1.45 | 93.25 | 23.3 |

$C^{13}$ NMR spectroscopy can be used to determine the copolymer composition and the randomness of the MA in the copolymer. The MA feed rate was the only variable to control the MA loading in the copolymer. Alternatively, one can determine if the copolymer is substantially random based on solubility testing or GPEC analysis, discussed below.

Figure 1:
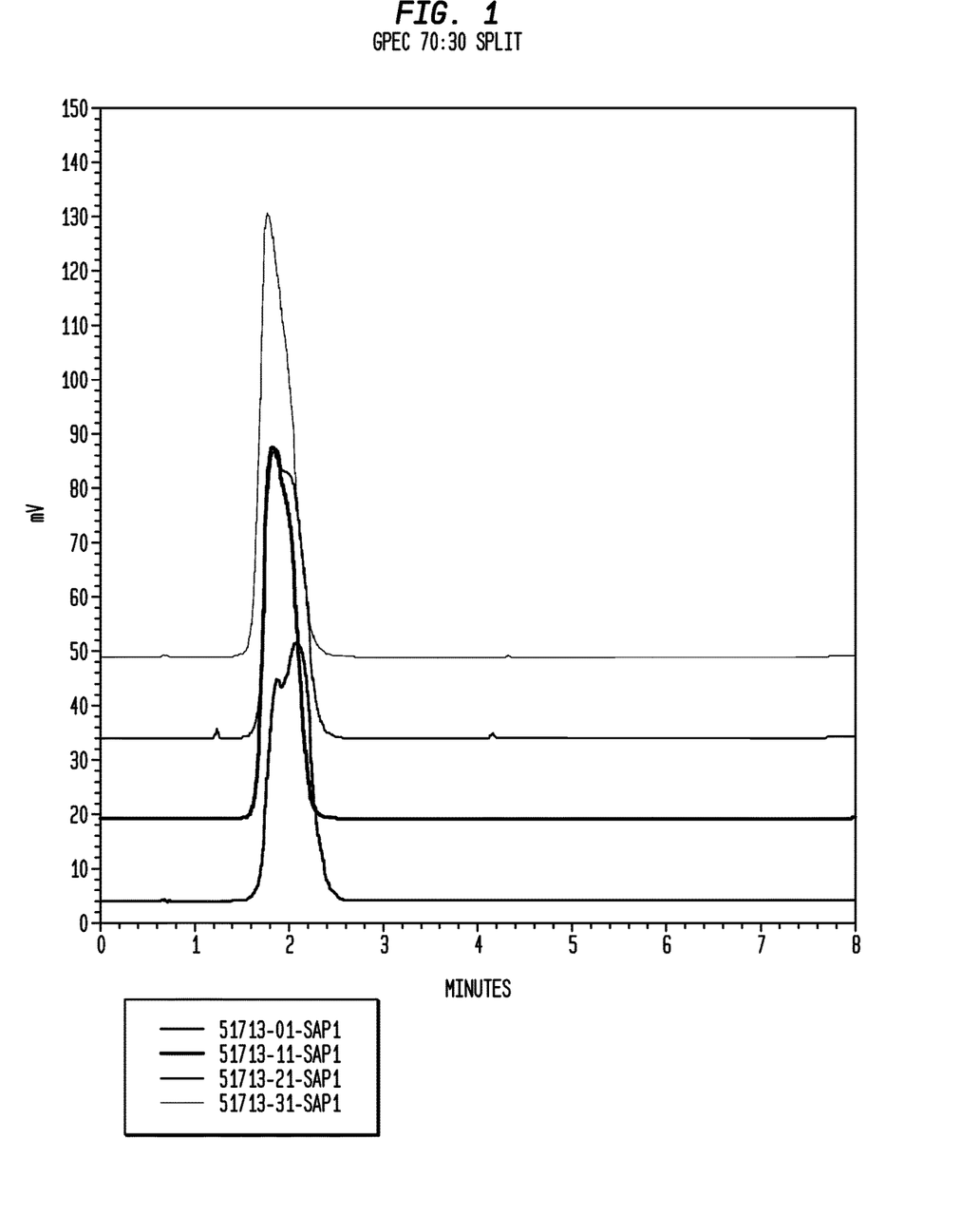
FIG. 1 is a GPEC trace of a polyvinyl alcohol-methyl acrylate copolymer obtained from a 70:30 split comonomer addition ratio of VAM and methyl acrylate (MA) according to the present invention, exhibiting excellent aqueous solubility. As the graph shows, the eluting polymer composition has substantially close polarity (substantial randomness) within a two minute interval as shown by the substantially single peak, or in other terms, the GPEC chromatogram is a substantially monomodal, that is, exhibits a single polymer peak.
Figure 2:
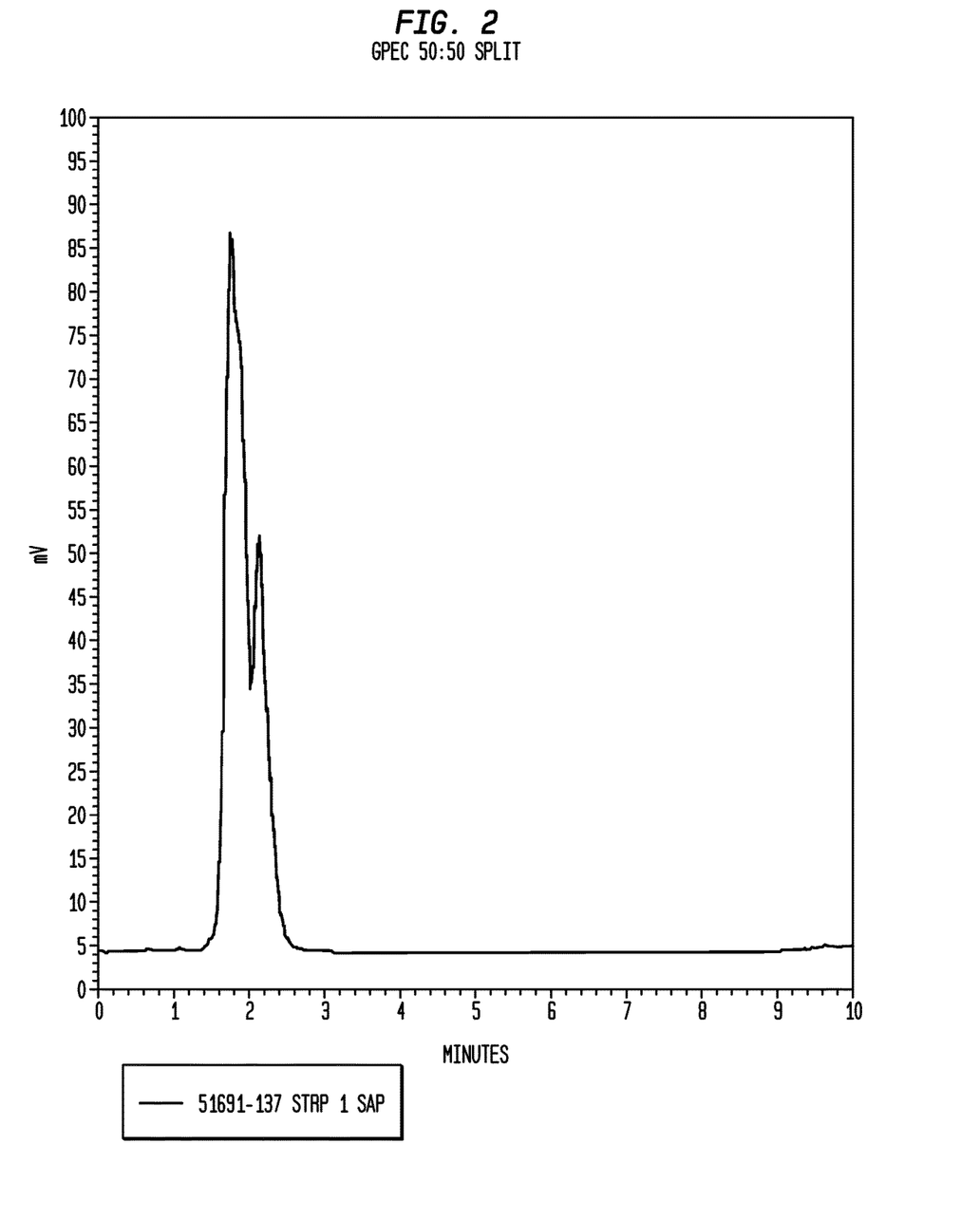
FIG. 2 is a GPEC trace of a polyvinyl alcohol-methyl acrylate copolymer obtained from a 50:50 split comonomer addition ratio of VAM and MA, exhibiting hazy aqueous solubility. The peak shows substantial randomness as in FIG. 1 but slight broadening of the composition as shown by the appearance of a second peak as part of the within the same time interval. Note that the two peaks are close in elution time and overlap substantially over more than 50% of their height from their baselines; we refer to this class of GPEC chromatogram as a close polarity GPEC chromatogram.
Figure 3:
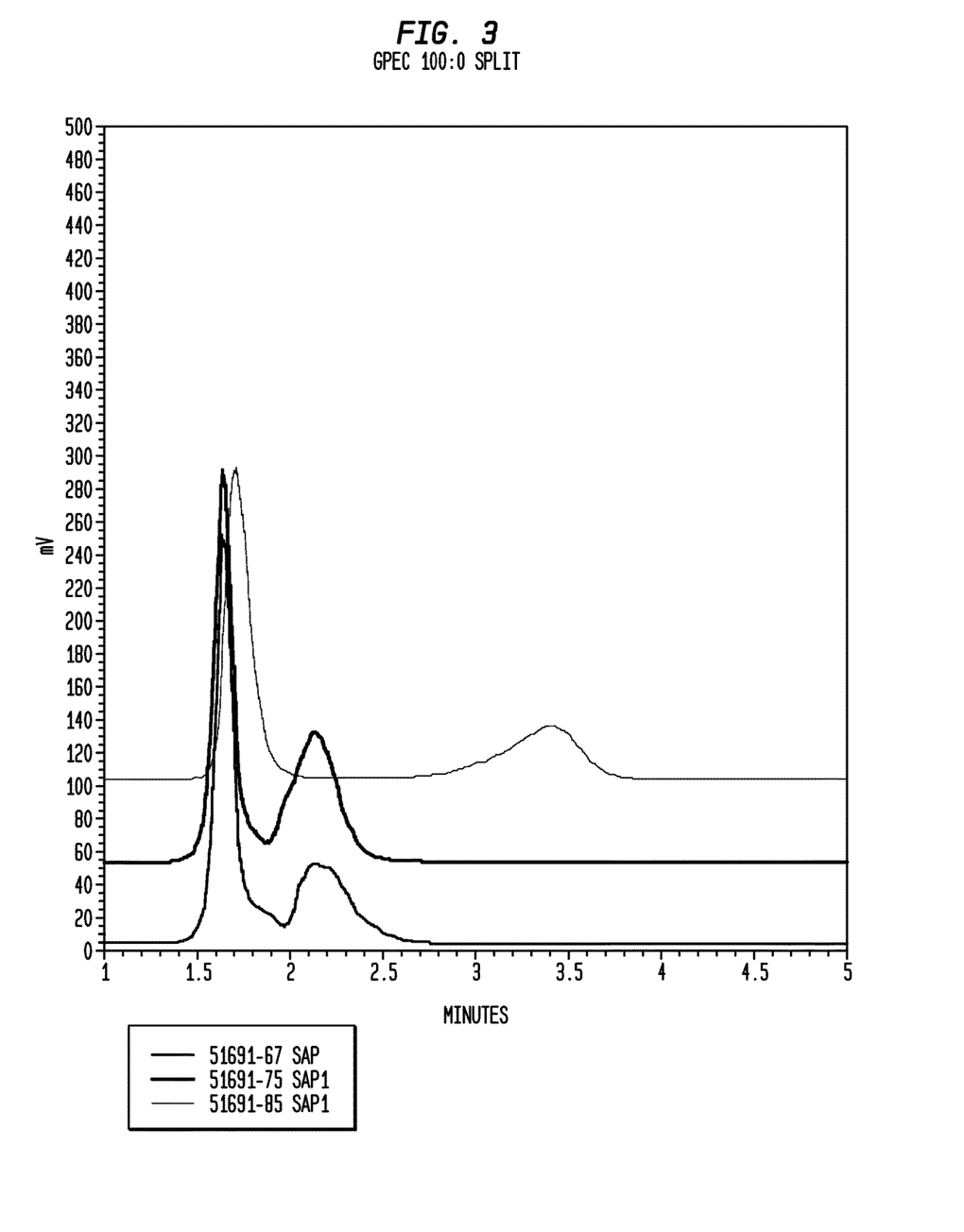
FIG. 3 is a GPEC trace of a polyvinyl alcohol-methyl acrylate copolymer obtained from a 100:0 split comonomer addition ratio of VAM and MA, with poor aqueous solubility. Discrete peaks start to appear showing the presence of polymer compositions with different polarities, in the case of FIG. 3 there is seen a bimodal GPEC chromatogram.

The randomness of the copolymers formed was determined by GPEC analysis and is shown in FIG. 1-3. GPEC is a technique which can be used to measure the chemical composition distribution in polymers by using mixtures of a solvent and non-solvent and is described in Cools et al., "Determination of the Chemical Composition Distribution of Copolymers of Styrene and Butadiene by Gradient Polymer Elution Chromatography", *Journal of Chromatograph A*, 736 (Elsevier Science B.V., 1996), pp. 125-130, the disclosure of which is incorporated herein by reference. For the copolymers of the invention, the following conditions, materials and equipment were used:

Column: Agilent PLRP-S 1000 A 5 μm 50×4.6 mm
Mobile phase:
1) start with 5% Acetonitrile, 95% water;
2) gradient to 60% Acetonitrile 40% water in 6 minutes, keep the ratio to 7.5 minutes;
3) gradient to 5% Acetonitrile, 95% water in 12 minutes;
4) condition column with 5% Acetonitrile, 95% water till 22 minutes, stop run.

Temperature: 65 C
Flow rate: 1 ml/min
Injection volume: 2 μl
Detector: ELSD
Sample conc. 5 mg/ml The polymer compositions shown in each of FIGS. 1-3 show polarity peaks as the polymer elutes from the column. The closer the peaks are the less the compositional drift is in the composition of the copolymer. For 100:0 split ratio monomer addition (FIG. 3), not only there are distinct peaks indicating substantial compositional drift but there are more number of peaks showing that distinct polymers-block, homopolymers and the like—are forming. The 50:50 split ratio polymer in FIG. 2 shows that the composition of the polymer formed is becoming more uniform (less compositional drift) than the 100:0 split ratio addition, while the 70:30 split ratio addition polymer in FIG. 1 has a monomodal chromatogram which shows substantial absence of compositional drift.

The data in Tables 1-4 indicates that copolymers of VOH and MA can be obtained at relatively high MA loadings, high conversion rates and productivity, high degree of hydrolysis and substantial absence of compositional drift, using the continuous process of this invention.

More generally, the invention includes a continuous process for making vinyl acetate/acrylate or acrylate derivative copolymers. Acrylate or acrylate derivative monomers and copolymers incorporating them are referred to herein as acrylate comonomers and acrylate copolymers, respectively, for purposes of convenience. There is thus provided in accordance with the invention a continuous process for making a vinyl acetate/acrylate copolymer comprising: (a) continuously supplying a reaction mixture including vinyl acetate and a more reactive acrylate comonomer to a reaction zone wherein the vinyl acetate and acrylate comonomer are at least partially consumed to form an intermediate reaction mixture; (b) continuously supplying to the intermediate reaction mixture a stream enriched with respect to the more reactive acrylate comonomer and copolymerizing the additional acrylate comonomer with the intermediate reaction mixture to form a vinyl acetate/acrylate copolymer product; and (c) continuously recovering the vinyl acetate/acrylate copolymer product.

Films were prepared from the PVOH made by the inventive process. In a typical experiment, water solutions of the copolymers were prepared (4-10 wt % solids) and cast onto glass plates. The solutions were allowed to dry overnight at room temperature, then peeled off the plates. The resulting films were conditioned at 22° C. and 50% RH for at least 24 hours before the properties were measured. The properties of the thus-prepared film including the improved aqueous solubility are shown in Table 5.

The solubility characteristics of the films can be determined by the slide frame test described in U.S. Pat. No. 7,745,517 which is incorporated herein in its entirety and is as follows. Films are prepared from the formulation by casting a 7% aqueous solution onto a glass plate, which is leveled by gravity and allowed to dry to a moisture content of from about 6 to 15% which may take from 2 to 7 days. An amount of the solution is added to the plate to provide for a film with a target thickness of about 76 μm. A 2.3×3.4 cm sample of film is mounted in a slide frame and placed in a 500 ml beaker 30 filled with 400 ml water. The beaker is placed on a magnetic stirrer, and the water is stirred with a magnetic stir bar at 400 rpm set by a control knob, such that a vortex is created. The water temperature is maintained at 21° C.+/−1° C. The frame is secured in the beaker with a clamp which is supported by a platform such that stirring water pushes against the film. The film begins to balloon or wave. The disintegration time is recorded when the film balloon bursts. After disintegration, the frame remains in water and the dissolution time is recorded as the total time (inclusive of disintegration time) when no residual strings of film and no film particles remain on the frame.

TABLE 5

Physical and solubility properties

| Example No. | Tensile (psig) | Modulus (psig) | Elong. (%) | Gauge (mil) | Disintegration (s) | Dissolution (s) |
|---|---|---|---|---|---|---|
| 1 | 4486 | 1153 | 532 | 3.05 | 26 | 52 |
| 2 | 3722 | 1128 | 44.3 | 2.88 | 22 | 43 |
| 3 | 4406 | 1327 | 496 | 2.9 | 22 | 60 |
| 4 | 4374 | 1103 | 554 | 3.03 | 20 | 40 |
| 5 | 4642 | 1531 | 515 | 3.13 | 31 | 52 |
| 6 | 4611 | 1175 | 510 | 3.1 | 29 | 59 |
| 7 | 4560 | 953 | 505 | 2.93 | 18 | 35 |
| 8 | 4760 | 1413 | 577 | 2.75 | 18 | 47 |
| 9 | 4669 | 1361 | 471 | 2.8 | 17 | 30 |
| 10 | 4302 | 1132 | 515 | 3 | 23 | 55 |

The invention thus describes a process to prepare PVOH with improved aqueous solubility by feeding the MA comonomer in two parts in two reactors as opposed to all in the same reactor. As a comparison, attempts were made to make the copolymer by adding all the monomers and initiator into one reactor. Attempts to make the copolymer by adding all the required monomers in the first reactor itself only resulted in PVOH that were insoluble or significantly reduced solubility as shown in Table 6. This is believed to be due to the formation of methyl acrylate blocks and/or methyl acrylate homopolymers in the copolymer. In Table 6, a film is deemed not to pass the dissolution test described above when it fails to disintegrate in three (3) minutes or more or it has a dissolution time of greater than ten (10) minutes.

TABLE 6

Single Reactor Addition of Methyl Acrylate

| Sample No. | 15% Viscosity | 4% Viscosity | DoH | MA loading | PK1 solids | PK2 solids | Remarks |
|---|---|---|---|---|---|---|---|
| 1 | 29.1 | 13 | 95.6 | 4.18 | 34 | 56 | Did not pass dissolution test |
| 2 | 33 | 14.4 | 95.64 | 3.69 | 37 | 62 | Did not pass dissolution test |
| 3 | 56.3 | 30.7 | 91.61 | 7.35 | 16 | 30 | Did not pass dissolution test |

DoH; Degree of Hydrolysis
PK1: Reactor 1
PK2; Reactor 2

Alternative Embodiments

In its various aspects, the invention also includes the following alternative embodiments:

Alternative Embodiment No. 1 is a process for the production of a copolymer of vinyl alcohol ("VOH") and alkyl acrylate ("AA") (such as methyl acrylate ("MA")) by copolymerizing vinyl acetate monomer ("VAM") and AA, said process comprising:

(a) continuously feeding into a first reactor zone, with agitation, substantially major amount of the required quantity of VAM and a first part of the required quantity of AA, a free radical yielding polymerization initiator, and a solvent for the two monomers, initiator, and copolymer resulting from the copolymerization of the two monomers, to form a first reaction mass;

(b) maintaining the first reaction mass in said first reaction zone under polymerization conditions for a residence time sufficient for a major proportion of AA fed to said first reaction zone to polymerize;

(c) continuously feeding said first reaction mass from said first reaction zone, along with a second part of AA, to a second reaction zone;

(d) maintaining the first reaction mass in the second reaction zone for a residence time sufficient to polymerize a major proportion of the MA to form a second reaction mass;

(e) continuously withdrawing said second reaction mass from the second reaction zone;

(f) separating copolymer of VAM and AA from the second reaction mass; and (g) saponifying by hydrolysis and/or alcoholysis a major proportion of the acetate groups in said copolymer to form a copolymer of VOH and AA, wherein said first part of AA and said second part of MA together account for all the required quantity of AA.

Alternative Embodiment No. 2 is a process of Alternative Embodiment No. 1, wherein 100% of the required VAM is fed in step (a).

Alternative Embodiment No. 3 is a process according to any of the preceding embodiments, wherein at least 80% of the required VAM is fed in step (a).

Alternative Embodiment No. 4 is a process according to any of the preceding embodiments, wherein at least 90% of the required VAM is fed in step (a).

Alternative Embodiment No. 5 is a process according to any of the preceding embodiments, wherein said solvent is methanol, ethanol or propanol.

Alternative Embodiment No. 6 is a process according to any of the preceding embodiments, wherein said solvent is methanol.

Alternative Embodiment No. 7 is a process according to any of the preceding embodiments, wherein the first part of MA and second part of MA are respectively in the ratio range of about 50:50 to about 80:20.

Alternative Embodiment No. 8 is a process according to any of the preceding embodiments, wherein the first part of MA and second part of MA are respectively in the ratio range of about 60:40 to about 75:25.

Alternative Embodiment No. 9 is a process according to any of the preceding embodiments, wherein the amount of said solvent fed to the first reaction zone is about 10 to about 40 wt. % based on the weight of VAM being fed.

Alternative Embodiment No. 10 is a process according to any of the preceding embodiments, wherein the average residence time in the first and second reaction zones of the components fed to the said reaction zones is about 30 to about 120 minutes.

Alternative Embodiment No. 11 is a process according to any of the preceding embodiments, wherein said average residence time is about 45 to about 70 minutes.

Alternative Embodiment No. 12 is a process according to any of the preceding embodiments, wherein the reaction temperature in said first and second reaction zones is about 55 to about 85° C.

Alternative Embodiment No. 13 is a process according to any of the preceding embodiments, wherein said reaction temperature is about 60 to 80° C.

Alternative Embodiment No. 14 is a process according to any of the preceding embodiments, wherein the average reaction pressure in each reaction zone is about 1 to about 30 psig.

Alternative Embodiment No. 15 is a process according to any of the preceding embodiments, wherein said reaction pressure is about 3 to about 15 psig.

Alternative Embodiment No. 16 is a process according to any of the preceding embodiments, wherein the residence times and temperatures in the first and second reaction zone result in the polymerization of substantially all the MA fed to the system.

Alternative Embodiment No. 17 is a process according to any of the preceding embodiments, wherein the effluent from said second reaction zone has an actual polymer solids content of about 35 to about 85% and the percent conversion calculated from said actual polymer solids content and the theoretical polymer solids content equal to the amount of monomers added to the system is about 45 to about 60%.

Alternative Embodiment No. 18 is a process according to any of the preceding embodiments, wherein the relative molecular weight of the VAM/MA copolymer obtained from the second reaction zone is indicated by a viscosity of a 15 wt. % solution of the copolymer in methanol of about 35 to about 80 cps.

Alternative Embodiment No. 19 is a process according to any of the preceding embodiments, wherein said percent conversion is about 40 to about 60%.

Alternative Embodiment No. 20 is a process according to any of the preceding embodiments, wherein the saponified copolymer of VOH and MA contains about 1 to about 8 mol % of polymerized MA, about 85 to about 98 mol % of polymerized VOH (PVOH), a degree of hydrolysis of about 70 to at least 99% indicated by $C^{13}$ NMR and a relative molecular weight indicated by a viscosity of a 4% aqueous solution of the VOH copolymer of about 15 to about 30 cps.

Alternative Embodiment No. 21 is PVOH prepared by any of the preceding embodiments.

Alternative Embodiment No. 22 is a copolymer of vinyl acetate and an alkyl acrylate prepared by a process comprising:

(a) continuously feeding into a first reactor zone, with agitation, substantially major amount of the required quantity of VAM and a first part of the required quantity of AA, a free radical yielding polymerization initiator, and a solvent for the two monomers, initiator, and copolymer resulting from the copolymerization of the two monomers, to form a first reaction mass;

(b) maintaining the first reaction mass in said first reaction zone under polymerization conditions for a residence time sufficient for a major proportion of AA fed to said first reaction zone to polymerize;

(c) continuously feeding said first reaction mass from said first reaction zone, along with a second part of AA, to a second reaction zone;

(d) maintaining the first reaction mass in the second reaction zone for a residence time sufficient to polymerize a major proportion of the MA to form a second reaction mass;

(e) continuously withdrawing said second reaction mass from the second reaction zone;

and (f) separating copolymer of VAM and AA from the second reaction mass, wherein said first part of AA and said second part of MA together account for all the required quantity of AA.

Alternative Embodiment No. 23 is the copolymer of Alternative Embodiment No. 22, wherein the first part of MA and second part of MA are respectively in the ratio range of about 50:50 to about 80:20.

Alternative Embodiment No. 24 is the copolymer of Alternative Embodiment No. 23, wherein the first part of MA and second part of MA are respectively in the ratio range of about 60:40 to about 75:25.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part.

Furthermore, those of ordinary skill in the art will appreciate that the foregoing description is by way of example only, and is not intended to limit the invention.

What is claimed is:

1. A cold-water soluble, substantially random copolymer of vinyl alcohol ("VOH") and alkyl acrylate ("AA") prepared by copolymerizing vinyl acetate monomer ("VAM") and AA followed by saponification, wherein upon saponification the copolymer exhibits a characteristic cold water film dissolution time of less than 3 minutes.

2. The cold-water soluble, substantially random copolymer of vinyl alcohol ("VOH") and alkyl acrylate ("AA") prepared by copolymerizing vinyl acetate monomer ("VAM") and AA followed by saponification according to claim 1, wherein the copolymer comprises from 2 to 25 mol % AA.

3. The cold-water soluble, substantially random copolymer of vinyl alcohol ("VOH") and alkyl acrylate ("AA") prepared by copolymerizing vinyl acetate monomer ("VAM") and AA followed by saponification according to claim 1, wherein the copolymer comprises from 3 to 10 mol % AA.

4. The cold-water soluble, substantially random copolymer of vinyl alcohol ("VOH") and alkyl acrylate ("AA") prepared by copolymerizing vinyl acetate monomer ("VAM") and AA followed by saponification according to claim 1, wherein the copolymer comprises from 4 to 8 mol % AA.

5. The cold-water soluble, substantially random copolymer of vinyl alcohol ("VOH") and alkyl acrylate ("AA") prepared by copolymerizing vinyl acetate monomer ("VAM") and AA followed by saponification according to claim 1, wherein upon saponification the copolymer exhibits a characteristic cold water film dissolution time of less than 2 minutes.

6. The cold-water soluble, substantially random copolymer of vinyl alcohol ("VOH") and alkyl acrylate ("AA") prepared by copolymerizing vinyl acetate monomer ("VAM") and AA followed by saponification according to claim 1, wherein upon saponification the copolymer exhibits a characteristic cold water film dissolution time of 1 minute or less.

7. The cold-water soluble, substantially random copolymer of vinyl alcohol ("VOH") and alkyl acrylate ("AA") prepared by copolymerizing vinyl acetate monomer ("VAM") and AA followed by saponification according to claim 1, wherein upon saponification the copolymer exhibits a characteristic cold water film disintegration time of less than 1 minute.

8. The cold-water soluble, substantially random copolymer of vinyl alcohol ("VOH") and alkyl acrylate ("AA") prepared by copolymerizing vinyl acetate monomer ("VAM") and AA followed by saponification according to claim 1, wherein the AA is selected from methyl acrylate (AA), ethyl acrylate, methyl methacrylate, ethyl methacrylate and mixtures thereof.

9. The cold-water soluble, substantially random copolymer of vinyl alcohol ("VOH") and alkyl acrylate ("AA") prepared by copolymerizing vinyl acetate monomer ("VAM") and AA followed by saponification, according to claim 1, wherein the AA is selected from methyl acrylate (MA) or ethyl acrylate.

10. A film made from the copolymer of claim 1.

11. The film according to claim 10, having a thickness of from 10 microns to 400 microns.

12. The film according to claim 10, having a thickness of from 25 microns to 100 microns.

13. An encapsulated product comprising an outer encapsulation film surrounding a core product, wherein the outer encapsulation film comprises a cold water soluble, substantially random copolymer of vinyl alcohol ("VOH") and alkyl acrylate ("AA") prepared by copolymerizing vinyl acetate monomer ("VAM") and AA followed by saponification, wherein upon saponification the copolymer exhibits a characteristic cold water film dissolution time of less than 3 minutes, wherein the AA is selected from methyl acrylate, ethyl acrylate, methyl methacrylate, ethyl methacrylate or mixtures thereof.

14. The encapsulated product comprising an outer encapsulation film surrounding a core product according to claim 13, wherein the outer encapsulation film has a thickness of from 0.05 microns to 25 microns.

15. The encapsulated product comprising an outer encapsulation film surrounding a core product according to claim 13, wherein the outer encapsulation film has a thickness of from 0.25 microns to 5 microns.

16. The encapsulated product comprising an outer encapsulation film surrounding a core product according to claim 13, wherein the core product is a particulate solid.

17. The encapsulated product comprising an outer encapsulation film surrounding a core product according to claim 13, wherein the cold water soluble, substantially random copolymer comprises from 3 to 10 mol % AA.

18. The encapsulated product comprising an outer encapsulation film surrounding a core product according to claim 13, wherein the cold water soluble, substantially random copolymer comprises from 4 to 8 mol % AA.

19. The encapsulated product comprising an outer encapsulation film surrounding a core product according to claim 13, wherein the alkyl acrylate is selected from methyl acrylate (MA) or ethyl acrylate.

20. The encapsulated product comprising an outer encapsulation film surrounding a core product according to claim 13, wherein the cold water soluble, substantially random copolymer of vinyl alcohol ("VOH") and alkyl acrylate ("AA") is saponified at a caustic mole ratio of moles of base to moles of acetate in the copolymer of about 0.01 to about 0.1.

21. The cold-water soluble, substantially random copolymer of vinyl alcohol ("VOH") and alkyl acrylate ("AA") prepared by copolymerizing vinyl acetate monomer ("VAM") and AA followed by saponification according to claim 1, wherein the cold water soluble, substantially random copolymer is saponified at a caustic mole ratio of moles of base to moles of acetate in the copolymer of about 0.01 to about 0.1.

* * * * *

UNITED STATES PATENT AND TRADEMARK OFFICE
CERTIFICATE OF CORRECTION

PATENT NO. : 10,316,124 B2
APPLICATION NO. : 13/328338
DATED : June 11, 2019
INVENTOR(S) : Richard Vicari and Bret F. Hann It is certified that error appears in the above-identified patent and that said Letters Patent is hereby corrected as shown below:

On the Title Page

Please correct the Assignee's (at item "(73) Assignee") name from "Sekassai Specialty Chemicals America, LLC" to --Sekisui Specialty Chemicals America, LLC--

Signed and Sealed this
Thirtieth Day of July, 2019

Andrei Iancu
*Director of the United States Patent and Trademark Office*